United States Patent [19]

Muzik

[11] 4,197,151
[45] Apr. 8, 1980

[54] GRAPHIC LAMINATE AND METHOD OF MAKING SAME

[76] Inventor: Glenn M. Muzik, 10809 Hastings, Westchester, Ill. 60153

[21] Appl. No.: 953,615

[22] Filed: Oct. 23, 1978

Related U.S. Application Data

[63] Continuation-in-part of Ser. No. 764,198, Jan. 31, 1977, Pat. No. 4,125,653.

[51] Int. Cl.² .................. B32B 31/06; B32B 31/12; C09J 7/02
[52] U.S. Cl. ................... 156/249; 156/152; 156/267; 156/235; 156/289; 156/299; 156/91; 156/237; 156/278; 156/312; 156/313; 427/211; 427/289; 427/290; 427/358; 427/359
[58] Field of Search ............. 156/63, 152, 249, 267, 156/289, 299, 308, 230; 427/211, 289, 290, 346, 358, 359, 407 R, 407 E, 407 F, 407 G; 428/13, 14, 40, 201, 202, 203, 204, 205, 206, 207, 208, 209, 310, 314, 315, 352, 900, 914

[56] References Cited

U.S. PATENT DOCUMENTS

| | | | |
|---|---|---|---|
| 3,373,068 | 3/1968 | Grosheim et al. | 156/289 |
| 3,517,106 | 6/1970 | Chase | 156/249 |
| 3,615,992 | 10/1971 | Jeffries et al. | 156/249 X |
| 4,037,008 | 7/1977 | Tugwell | 156/249 X |
| 4,077,830 | 3/1978 | Fulwiler | 156/249 |

Primary Examiner—George F. Lesmes
Assistant Examiner—R. Eugene Varndell, Jr.
Attorney, Agent, or Firm—Fitch, Even & Tabin

[57] ABSTRACT

A graphic laminate for mounting a sheet-like article such as a photograph or the like includes a flat mounting base, a layer of plastic material having a pressure sensitive adhesive coating on both surfaces thereof, one such surface being placed in contact with the front side of the base and the sheet-like article being placed in contact with the other surface of the plastic material to form a laminate with the plastic material lying intermediate the base and the sheet-like article. The description includes a method of making this laminate.

11 Claims, 26 Drawing Figures

GRAPHIC LAMINATE AND METHOD OF MAKING SAME

This application is a continuation-in-part of application Ser. No. 764,198, filed Jan. 31, 1977, now U.S. Pat. No. 4,125,653, issued Nov. 14, 1978.

This invention relates to graphic arts and particularly to a laminate for mounting a photograph, drawing, print, graph, newsprint, map, chart or the like and to a method of making the same.

It is a familiar experience that various sheet-like articles such as photographs, drawings, prints, graphs, newsprint, maps, charts and the like are mounted on supportive backings for a variety of reasons. For example, they may be used in education as visual and training aids, in domestic, commercial, or industrial areas as art objects, and they simply may be mounted to strengthen, preserve or protect the article.

Machines are available for mounting such sheet-like articles, but such machines have high initial costs and further require costs of maintenance and operation. Moreover, machines typically utilize time and heat along with pressure to laminate such articles, and where color photographs are involved, heat is detrimental to the photographic emulsion. In addition, machines may be limited in the size of sheet-like articles they are capable of laminating.

It is also a familiar experience in the graphic arts that such articles are mounted by hand. Conventionally, rubber cement, white glue, aerosol sprays, wallpaper paste, and hot glue are utilized as adhesives for hand mounting and lamination. It is well known, for example, to mount a drawing or photograph with rubber cement. The bases used in rubber cement, however, may act as a solvent and dissolve a water resistant support in time, such as a resin sizing, in paper often used for photographs as well as other materials sometimes associated with such mountings. These bases are generally flammable and may be toxic. Further, ozone and ultraviolet light may have a degrading effect in time on rubber cement.

White glues may be used for some mountings, but these glues typically have a water base which may be absorbed into the backing material (mounting base) and cause a warping of the material in drying. On the other hand, white glues do not form a good bond for paper having a water resistant support, because the adhesive from the glue is repelled by the non-porous nature of the paper. Furthermore, all of these adhesives along with wallpaper paste and hot glue are messy and in some instances are slow to set up. Aerosol adhesives are generally expensive, unreliable when used on large surfaces and some may be toxic to personnel using them.

Not only are these adhesives troublesome, but the various forms of paper and paperboard typically used as the backing material for mounting photographs and the like tend to absorb moisture from the atmosphere, warping the product and leaving it unsightly and otherwise undesirable.

There are occasions when a user wants to write additional data on a visual or training aid, such as a map or graph, after the article is mounted. To do this, it is known to apply a transparent plastic film, such as a non-adhesive coated film, over the displayed article and tape the film and article together around the edges. The film seldom lies flat and after being written on, tends to further separate from the drawing, and with age turns brittle and yellow, again leaving an unsightly product. Moreover, the non-flat condition of the film makes viewing of the article difficult because of resulting light reflection and refraction.

It is desirable, therefore, to provide a method of mounting and laminating a sheet-like article, such as a photograph or the like, that is simple and inexpensive and yet produces a product having top quality eye appeal, not only initially, but through extended time and use.

While mounting methods in the graphic arts and laminations resulting therefrom have been developed and are known, it is an object of this invention to provide an improved graphic lamination for mounting a sheet-like article such as a photograph or the like that has high quality eye appeal initially and that enhances the durability of such quality appearance through extended periods of time and use.

It is another object of this invention to provide a graphic laminate of the foregoing type which further provides for the use of markers held by magnetic attraction but movable on its front surface at the discretion of a user.

It is yet another object of this invention to provide a method of producing a graphic laminate for mounting a sheet-like article such as a photograph or the like that is clean, simple and effective for making a graphic laminate of the foregoing type.

Other objects of the invention will become apparent and the invention readily understood from the following description read in connection with the accompanying drawings in which:

FIG. 9b is an enlarged fragmentary view in section of the partially completed laminate as viewed in a plane taken along the line 9b—9b of FIG. 9a;

Briefly, a graphic laminate constructed in accordance with the invention is one which avoids the use of rubber cement, white glue, wallpaper paste, aerosol adhesives or hot glue to secure the various layers. Further, it avoids the use of backings or mounting bases which tend to warp or wrinkle. Rather, it employs available materials and special methods to produce a flat, easily formed laminate that has new forms of eye appeal and the ability to maintain this eye appeal throughout extended periods of time and use. The effect is to simplify the forming of the laminate, making it more economically constructed while also enhancing its durability.

As used herein, the terms "graphic" and "graphic arts" are intended to broadly include writings, drawings, photographs, engravings, maps, charts, graphs, printed materials, and the like and reproductions of the same that are prepared on flat surfaces for various purposes, such as for visual and training aids in education, for domestic and commercial artwork, and for other pictorial representations. These terms also include the techniques and crafts associated with the foregoing. Also as used herein, the term "laminate" when used as a noun is intended to refer to the product made by laminating.

Figure 1A:
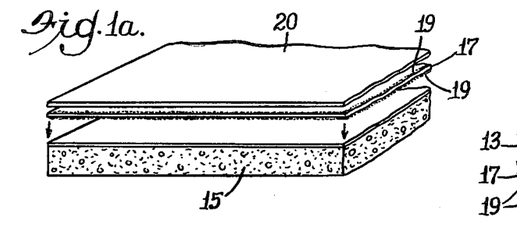
FIG. 1a is an enlarged fragmentary view in perspective of a preferred form of a partially completed laminate of this invention with layers separated for clarity of illustration.
Figure 1B:
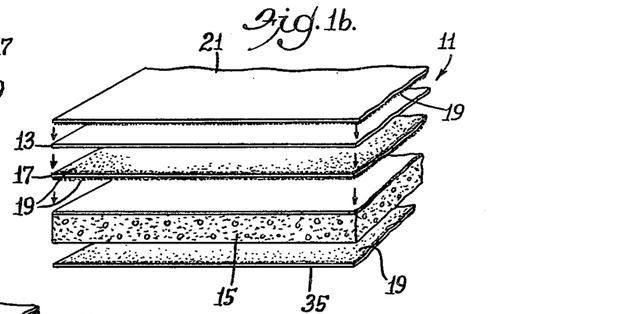
FIG. 1b is an enlarged fragmentary view in perspective of a preferred form of a completed laminate of this invention with layers separated for clarity of illustration.
Figure 1C:
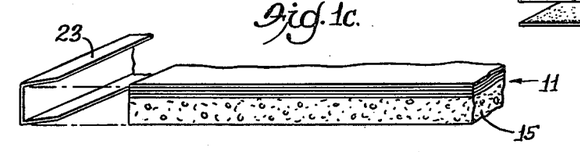
FIG. 1c is an enlarged fragmentary view in perspective of a preferred form of laminate of this invention illustrating a border frame member that may be added.

Referring initially to FIGS. 1a–1c of the drawing, there is shown a graphic laminate 11 for mounting a sheet-like article such as a photograph 13. In FIG. 1b this laminate 11 is shown wherein the photograph 13 is mounted on a flat mounting base 15. In between the photograph 13 and the flat mounting base 15, however, is a layer of plastic material 17 having a coating 19 of a pressure sensitive adhesive on both its front and back surfaces. Initially, a release paper 20 is on the front surface of the plastic material 17 in contact with the coating 19. After the release paper is removed, the photograph 13 is superposed on the front surface of the plastic material 17 in contact with and held in position by the pressure sensitive adhesive coating 19. A front transparent sheet 21 may then be applied to the photograph as discussed hereinafter.

The base 15 is of a suitable non-warping material, such as a product combining fiberboard and plastics sold under the trademark MASONITE, or a foam board. A foam board is a sandwich laminate of heavy paper or paperboard liner facings filled with an expanded synthetic resinous material (foam). One such foam board is a laminate of polystyrene between high quality paperboard liner facings sold under the trademark FOME-COR, manufactured by Monsanto Company, Plastics Products & Resins Division, Kenilworth, N.J. A foam board is lightweight while being rigid and sturdy. It is also easily cut to a desired size and shape. Foam boards are available in various thicknesses, and an acceptable thickness for this purpose is 3/16 inch.

The plastic material 17 may be a suitable flexible organopolymeric element, such as a plasticized polyvinylchloride sheet. This plastic material 17 in the illustrated embodiment is about 0.004 inch in thickness. The pressure sensitive adhesive coating 19 may be an extremely clear, transparent acrylic type glue. The plastic material 17 with the double coats 19 of adhesive material thereon may be supplied in roll form with a release paper being provided in contact with one of the adhesive coated surfaces. The plastic material 17 may be transparent, translucent white, or opaque black, as will be described in detail hereinafter. Preferably, the pressure sensitive adhesive coatings initially have a low task factor when exposed to air, which tack factor increases as the adhesive dries in contact with another surface and creates a more permanent bond to the other surface. As is described in detail hereinafter, the photograph 13 may be on two kinds of paper; that which has a water resistant support, such as a resin sizing, and that which has no water resistant support. Paper having a water resistant support is preferred, although both kinds may be used in accordance with the invention. A difficulty with laminating photographic paper having no water resistant support is that such paper does not dry perfectly flat in some photographic drying systems, leaving a tendency to wrinkle in some areas of a sheet when it is pressed against a flat backing.

Further protection may be given to the photograph 13, or similar sheet-like article, by superposing on its front face the transparent sheet 21 through which the photograph 13 is viewed. This transparent sheet 21 may also be plastic material and may be a suitable flexible organopolymeric element, such as a plasticized polyvinylchloride sheet, an acetate sheet, a flexible polyester film sold under the trademark MYLAR, and the like. This front covering material in the illustrated embodiment is between about 0.004 inch and about 0.005 inch in thickness, except when MYLAR is used, which may be between 0.0005 inch and 0.005 inch thick. MYLAR has a high shine and does not tear or turn yellow. Preferably, this transparent sheet 21 also has a transparent, pressure sensitive adhesive coating 19 (FIG. 1b), but on only one of its surfaces. The adhesive coating 19 is placed in superposed contact on the front of the photograph 13 when the transparent sheet 21 is added to the laminate 11.

As used throughout this description, the term "front" as applied to a given lamina or layer refers to that surface which normally faces the viewer, and the term "back" or "rear" refers to the opposing surface. Thus, the photograph 13 is backed by the plastic material 17 having adhesive coatings 19 on both sides and further backed by the flat mounting base 15, and its front is the surface seen by the viewer, no matter what plane the photograph is mounted in. For example, the photograph may be mounted overhead on a ceiling, vertically on a wall or horizontally on a table or floor.

Figures 7A, 7B, 7C, 7D, 7E, 7F, 7G, 7H, 8:
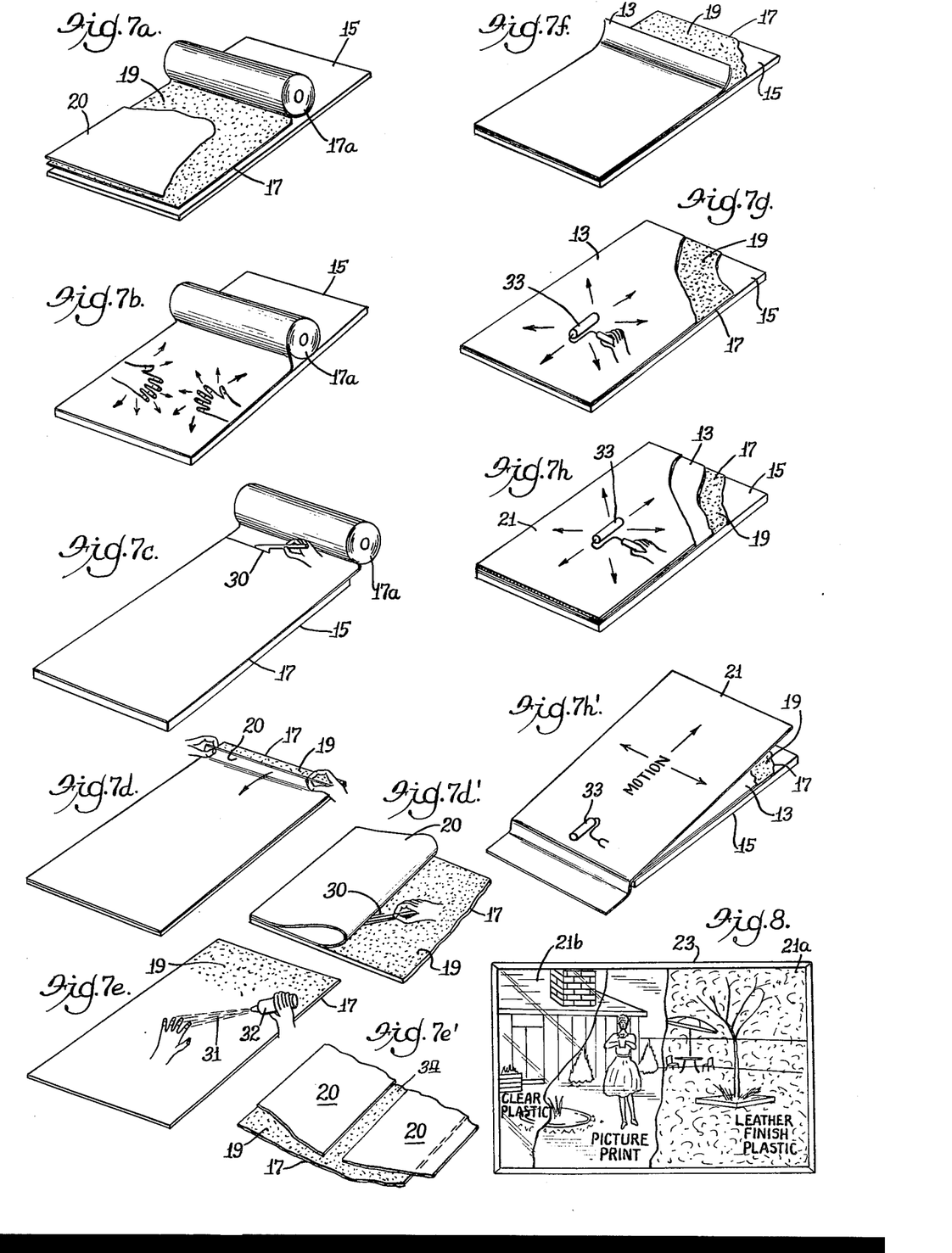
FIGS. 7a–7h, including 7d', 7e' and 7h', are perspective views of making a laminate of this invention.
FIG. 8 is a plan view of a completed laminate of this invention illustrating various front finishes of the laminate in accordance with this invention.

The front transparent sheet 21 protects the photograph, for example, from skin oils resulting from handling. Interesting effects can be created by this front transparent sheet, as best illustrated in FIG. 8. The photograph may be left without any front sheet (center section). Alternatively, the sheet 21 may be embossed so as to give it a leather-like appearance 21a or some other suitable textured appearance. Such a textured sheet gives the photograph a three-dimensional appearance, and the photograph appears to become more a part of the plastic covering, rather than the plastic covering being an additional layer on the surface of the photograph. For a smooth finish, on the other hand, the plastic material preferably has a low sheen and is untextured, as illustrated at 21b. All layers are trimmed to be coextensive with one another, and if desired a simple channel-type border frame 23 may encompass the laminate 11 (FIGS. 1c and 8).

Figure 5:
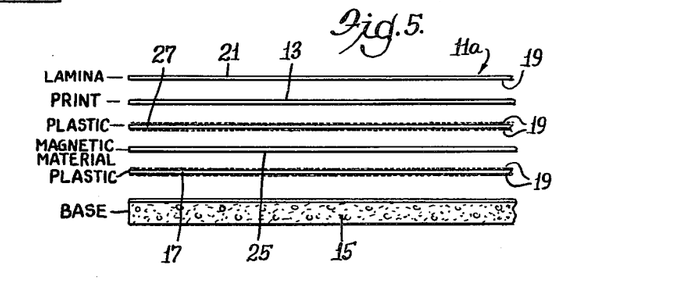
FIG. 5 is another enlarged fragmentary view in section of an alternative form of laminate with layers separated for clarity of illustration.
Figure 6:
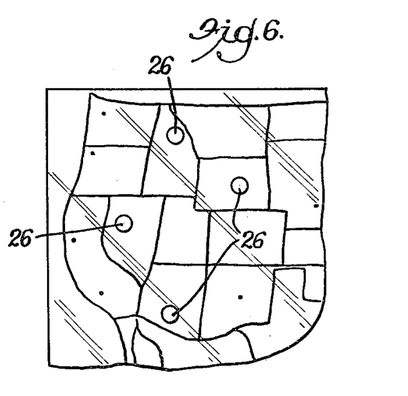
FIG. 6 is a fragmentary plan view depicting a particular use for the laminate of FIG. 5.

A variation 11a of the laminate is shown in FIG. 5. In the laminate 11a, a layer of magnetic material 25, which may be a steel sheet having a thickness of about 0.002 inch to 0.008 inch is provided. Such magnetic material in the laminate permits use of movable magnetic indicator members 26 (FIG. 6), such as rubber or ceramic magnetized discs, letters, markers, symbols or the like on the front surface. The magnetic material 25 is coextensive with the general laminate, and these members 26 can be applied and moved over the entire surface for use with aerial photographs, progress charts in control centers, or other such visual and training aids. A thicker gauge steel sheet would only add weight to the laminate and make it more difficult to handle without significantly improving magnetic attraction. Alternatively, this layer 25 may be a sheet form of flexible thermoplastic that internally binds together finely divided particles, such as barium ferrite, capable of being permanently magnetized. Such a thermoplastic magnetized sheet applied between a drawing and a base affords the advantageous use of materials having magnetic properties, such as iron, ferromagnetic materials, various alloys and the like for the indicator members 26, which materials are not permanently magnetized. Thermoplastic magnetic sheets vary between 0.015 inch and 0.020 inch in thickness. Thus, the magnetized portion of the combination may be either in the indicator members placed on the front of the laminate or in the layer sandwiched in the laminate.

It should be noted, however, that the alternative form of graphic laminate 11a illustrated in FIG. 5 has more than the simple addition of the one layer of magnetic material 25 therein. Specifically, a second lamina of plastic material shown at 27 is also provided that has a pressure sensitive adhesive coating 19 on both sides thereof. This layer 27 is superposed in contact with the front (top as viewed in FIG. 6) of the magnetic material 25. The photograph 13 is then superposed on the front of the second layer of plastic material 27 in contact with the pressure sensitive adhesive coating 19.

Figure 2:
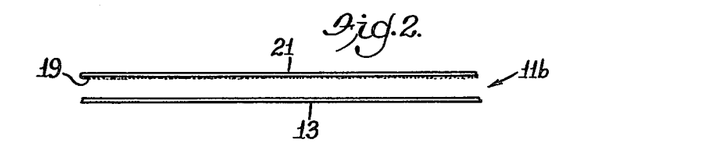
FIG. 2 is an enlarged fragmentary view in section of an alternative form of laminate with layers separated for clarity of illustration.
Figure 3:
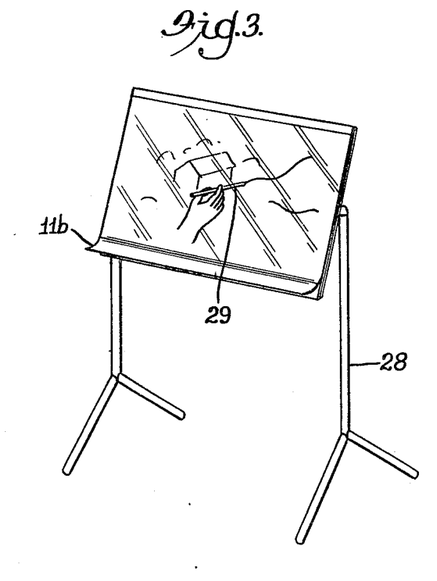
FIG. 3 is a perspective view depicting a particular use for the laminate of FIG. 2.

A further variation of the graphic laminate is shown in FIG. 2. In this instance, a laminate 11b is useful where drawings or charts are used as flip charts on single or double easel type supports, such as an easel 28 in FIG. 3. Here there is at least a threefold purpose: (1) to protect the chart or drawing, (2) to increase chart material strength, and (3) to provide an erasable surface on which the user can write additional graphic data with suitable writing tools, such as a water base felt tip pen 29 or a grease pencil. To accomplish this, a transparent front sheet 21 having a pressure sensitive adhesive coating 19, on only one side thereof is supported on the front surface of the photograph 13 and is substantially coextensive with the photograph. For this purpose, if acetate or MYLAR is used as the flexible plastic sheet, there is presented a hard gloss surface which can be written on with a grease pencil, a water base felt pen, or liquid chalk pens as used on highly glazed ceramic chalkboard surfaces. The vinyl surface, on the other hand, is more porous and only water base felt tip pens should be used. It has been found that the dyes used in some of the available felt tip pens may "burn-in" in a short time and cause permanent ghosting in the vinyl surface after the marks are removed from the surface. Not all pens have such permanent effect, but it has been found that the plasticizer secreting from the vinyl also contributes to the "burn-in" effect and should be removed before writing on the surface. An ammonia type window cleaner may be used for removing the plasticizer. Where MYLAR is used as the transparent front sheet, liquid chalk board type pens which are fast drying, of the type available for liquid chalkboard systems, leave easily removed marks and may be used for writing.

Figure 4:
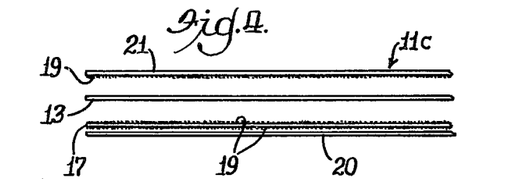
FIG. 4 is another enlarged fragmentary view in section of an alternative form of laminate with layers separated for clarity of illustration.

In connection with the laminated, unmounted chart 11b just described, the unmounted chart could be converted to a ready-to-mount chart 11c (FIG. 4) by adding a backing to the chart of double-stick plastic, such as the plastic material 17 having pressure sensitive adhesive coatings 19 on both sides thereof. The release paper 20 remains on the back side of the plastic material 17, and later at a user's option, this chart can be mounted by removing the release paper 20 and pressing the chart with the then exposed sensitive adhesive coating 19 on most any smooth, clean surface.

Reference was made earlier to the possibility of the double adhesive coated plastic material 17 being transparent, translucent white, or opaque black. Although the facing lamina, such as the front single adhesive coated transparent sheet 21 (FIGS. 1b and 5) through which the photograph is viewed is transparent, the double adhesive coated backing material for the photograph (whether the first layer of plastic material 17 or the second layer of plastic material 27), desirably has different properties, translucent white being preferable for many uses. This provides a reflective backing that enhances the photograph 13 or other article. It has been found, however, that where a drawing or printing has been made on newsprint, tissue paper or the like, or is a double sided map, a white translucent reflective surface reflects indicia from the back side, and this may have the effect of blurring, ghosting, or print-through. The use of black opaque as a backing in these instances, on the other hand, substantially decreases such ghosting or print-through and may eliminate such altogether, because front light highlights the front surface of the drawing or other article and there is very little reflection from the black backing to cause a print-through from the back side of the same drawing. Transparency is neutral to both of the foregoing purposes, but may be advantageous for uses described hereinafter.

One manufacturer of plastic material usable in accordance with this invention is Flexcon Company, Inc., Spencer, Mass., who identifies a double coated vinyl material as DSV, and a single coated clear vinyl as FC. Flexcon also manufactures acetate sheets and textured vinyl.

The method of making the graphic laminate 11 and the variations thereof, totally avoids the use of machines and requires only a few simple hand tools. The first step, as illustrated in FIG. 7a is to lay the flat mounting base 15 on a convenient surface (not shown) and clean the base of dust and other particulate matter. The adhesive backed plastic material, for purposes of illustration, is supplied from a roll 17a of such material with the release paper 20 in contact with one of the adhesive coated surfaces 19. In such instance, the release paper is generally on the outside of the roll and as the web of material is unrolled, the exposed adhesive coated surface (without the release paper) is the inside surface. This exposed adhesive surface is the one that will be pressed in contact with the front surface of the base. It is therefore important to hold the plastic material overhead of the base and out of contact thereof until the unrolled web is aligned with the base. Some rolls may be 54 inches wide, and it will be helpful if two persons are available to handle such a roll, one person being on either end of the roll and thus on either side of the base 15.

Next, in FIG. 7b, with the extended palm and fingers of one hand, each person applies pressure to cause contact between the pressure sensitive adhesive coated plastic and the base. Pressure is lightly applied from the center outwardly to each edge of the board and forwardly toward the roll 17a. This action is best done in approximately three-foot increments, and if a long base is being covered, these motions are repeated until the entire surface is covered.

Then, as shown in FIG. 7c using a razor type knife 30, the plastic web is cut from the roll near the end of the mounting base. All edges are then trimmed, and if a foam board is used as the mounting base, the board itself can be easily trimmed with this knife. This causes the double adhesive-backed plastic to be coextensive with the mounting board and assures a positive contact between the plastic and the board at all edges. Although for purposes of illustration a generally rectangular laminate is shown, it should be understood that any shape can be cut as appropriate, and there is no intention of limiting the invention to rectangular shapes.

This double adhesive-backed plastic 17 may be either translucent white or opaque black as needed for the type of mounting as described earlier. At this point, as indicated in FIG. 7d, the release paper 20 is removed. Because the exposed pressure sensitive adhesive coating is tacky, a photograph or other sheet-like article would tend to stick on contact, especially if the paper of the photograph carries a water resistant support. Hence, minor repositioning of the photograph becomes difficult, yet it is desirable. To overcome this difficulty, in accordance with the invention, a solution of one-half teaspoon liquid detergent of long lasting ability is added to one gallon of warm water, and such solution 31 is applied uniformly over the adhesive coating 19 after the release paper 20 has been removed. As shown in FIG. 7e, such solution 31 can be applied from a squeeze type bottle 32 and spread over the surface with the palm and fingers of the hands. This solution materially reduces the stick factor of the adhesive and allows for minor repositioning of the photograph 13 being mounted in FIG. 7f once contact is made with the surface. This is desirable, of course, in order to align and position the photograph 13 with respect to the mounting base, all a part of the mounting step of FIG. 7f.

Photographic paper having a water resistant support does not absorb the moisture from the solution, but the moisture needs to be removed from between the surfaces to allow the pressure sensitive adhesive to bond the surfaces properly. As illustrated in FIG. 7g, a hard rubber roller 33 of the type used for spreading printer's ink, is utilized to roll the water out from between the surfaces, starting from the center of the surface and working in strokes of moderate pressure radially outwardly in all directions toward all edges. There is only a minimal amount of moisture left under the photograph after this process, and the adhesive forms a permanent bond in four to six hours, depending on ambient conditions.

A different procedure is followed in connection with the steps described in FIGS. 7d through 7g when the photograph 13 or other article being mounted is on paper not having a water resistant support. Such paper would immediately absorb moisture from the positioning solution 31, to the detriment of the photograph. The alternative steps to avoid use of the positioning solution 31 and yet afford minor repositioning of the photograph for proper alignment before causing contact of the entire surface involves first of all a variance of removing the release paper 20. In the alternative steps, approximately one-half of the release paper 20 is removed from along one side edge of the plastic material 17 and rolled over on top of the other half without causing a crease, as shown in FIG. 7d'. The razor knife 30 is used to cut the release paper longitudinally into two approximately equal parts. The removed half is then replaced in contact with the adhesive coating 19 after allowing for a narrow gap 34 between halves as shown in FIG. 7e', the replaced half of release paper hanging over the edge of the doublecoated plastic material 17 the extent of the width of the gap 34. Although the terms "side" edge and "longitudinally" have been used in this description, it is not intended to limit this method to such orientation, the transverse relationships being workable also.

The photograph 13 is then laid over the release paper to align with the laminate at the corners and side edge before pressing in contact with the adhesive coating 19 in the gap 34. Such contact will then secure the position of the photograph with the aid of one hand on the photograph over the gap while the other hand is used to remove one half of the split release paper 20 at a time and pressing from the gap outwardly to each side edge to engage that part of the photograph smoothly with the coated surface 19. It is desirable, even though no moisture is between the surfaces, to use the roller 33 with moderate pressure as shown in FIG. 7g after smoothing by hand. This assures uniform contact across the entire mating surfaces to enhance the appearance and establish a lasting bond.

It should be noted at this point that the release paper or liner 20 used in the illustrated embodiment preferably is a 90 pound paper having a polyethelene coating on one side and a silicone coating over both sides including the polyethelene coating. The combination of these coats on the one side results in a shiny appearance and a surface that adheres only lightly to the adhesive coating 19 which it is to protect. When the removed half of the release paper is replaced, it will lightly adhere again if any pressure is applied, since it is pressure sensitive, causing some inconvenience in the removal of the release sheet when sliding it from under the photograph. For this reason, it is desirable to carefully lay the release paper over the adhesive coatng when replacing it as described above and to not apply pressure. Alternatively it may be desirable to turn the removed half of the release paper over and apply the silicone only coated (dull) side to the adhesive coating 19 before applying the photograph. In such instance, the other half of the release paper would also be removed, turned over and then replaced. It has been found that with this preferred release liner, there is almost no tendency for this dull side to adhere to the adhesive coating, thus simplifying the removal of the release paper when sliding it out from under the photograph. The term "half" is used by way of example only. Other proportions for the two parts may be used in accordance with this invention. Turning the release liner over in this step is not advisable for all release liners, however, and it is suggested that a test be made to determine the amount of adherence of this dull side before applying its full area to the adhesive coating.

To further laminate the photograph or drawing, the front transparent sheet 21 having a pressure sensitive adhesive coating 19 on one side thereof with a release sheet in contact with this coating 19 is initially trimmed to the approximate dimensions of the photograph. If the photograph is black and white and is on paper having a water resistant support, the front surface of the photograph is then cleaned with a light coating of the positioning solution 31. If, on the other hand, the photograph is on paper not having a water resistant support or the photograph is in color, the front surface of the photograph preferably is first coated with a lacquer that is suitable for sealing the emulsion to avoid color runs and/or absorption of moisture by the paper stock. After such sealing, the light coat of positioning solution 31 is then spread evenly over the sealed surface. Next, as shown in FIG. 7h, the release sheet is removed from the transparent sheet and the adhesive surface 19 is placed in contact with the front surface of the photograph. Again, using the roller 33, the moisture is removed from between the surfaces by starting in the center and rolling in strokes radially outwardly in all directions to the edges. If the paper of the photograph does not have a water resistant support, the solution 31 is not used and instead the surface of the photograph is wiped with a lint-free cloth before the transparent sheet 21 is applied and rolled.

To apply a textured vinyl as the front lamina, the application as described in connection with FIG. 7h is followed. Although textured plastic is not suitable for writing on its surface, it is excellent for book covers, murals, or drawings and photographs that might be hung on the wall. If the plastic used for the front lamina is acetate or thicker MYLAR (closer to the 0.005 inch end of range rather than the 0.0005 inch end), a slight deviation from the above steps should be noted. These materials have a tendency to curl and are a little more difficult to work with. When laminating these materials, it is preferable to use less of the positioning solution 31, because a lower moisture content will bond more readily and lessen the tendency to lift and curl.

In the instance of making the laminate 11a of FIG. 5 having the magnetic layer 25, the metal or thermoplastic magnetic sheet are both more easily handled after trial alignment touch points have been made on an adhesive coated base surface than is paper, and the positioning solution 31 need not first be applied to the double-coated plastic 17. Rather, the metal or thermoplastic magnetic sheet may be applied directly to the plastic 17. The second layer of plastic 27 and the photograph 13 are then applied to the magnetic layer 35 as described for FIGS. 7b through 7g, applying the alternative steps shown in FIGS. 7d' and 7e' where applicable. Only the step described in connection with FIG. 7h is needed for making the laminate 11b shown in FIG. 2, and only the steps described for FIGS. 7d through 7h are needed for the laminate 11c shown in FIG. 4.

In this connection, when laminates are being made in accordance with this invention, it is, of course, desirable that all layers comprising the laminates adhere to one another uniformly and without wrinkles or voids in bonding between adjacent layers. While these method steps serve to accomplish this, a further caution is in order. After removal of the release paper 20 from any of the adhesive coated surfaces 19, care should be taken to avoid disturbing the exposed adhesive coating in any manner, except for the application of the positioning solution 31 described earlier, so as to avoid contaminating the surface and thus to preserve the adhesive quality of the entire surface for forming a complete bond with the next applied lamina. Large dust particles, bits of paper, finger marks and oils and other foreign matter may be detrimental to such adhesive quality and cause undesirable bond voids if allowed to contact such exposed adhesive surfaces. The tendency for this to happen is enhanced by static electricity that is created when the release paper is removed from the adhesive coated plastic. Hence, a clean work area is desirable.

When laminates are being made in accordance with this invention that are about two feet by three feet or larger and are being laminated in an ambient atmosphere of high humidity, another transparent sheet 35 (FIG. 1b) having an adhesive coating 19 on one of its surfaces, which sheet could be the same as used for the front lamina 21, is desirably applied also to the back side of the mounting base 15. Such application will offset any forces that might be present by virtue of the paperboard facings of the foam board shrinking under dryer conditions after the superposed plastic layer 17 has been applied and pulling against the plastic to cause a slight warp. Accordingly, such a laminate would be faced on both front and rear with a transparent sheet 21.

Further, when making laminates in accordance with this invention that are about two feet by three feet or larger, a slight deviation in the procedure described in connection with FIG. 7h should be noted. As shown in FIG. 7h', after the surface of the sheet-like article has been prepared as described earlier, a transparent sheet 21 is cut to the approximate size of the article, allowing about two inches additional material for one end. Only about three inches of the release paper 20 is peeled initially from this end, and the peeled portion of the release paper is folded back upon the unpeeled portion and creased. The exposed adhesive coating 19 is then pressed without wrinkling onto an adjacent cleaned portion of a work surface, such as a table (not shown), and, if the sheet-like article contains a water resistant support, the positioning solution 31 is then uniformly applied to the surface of the article. The solution is omitted for all papers not having the support. Next, the release paper 20 is completely removed, and the transparent sheet 21 is extended out and over the article from the sheet's point of contact on the work surface at an inclined angle, for example about a 30° angle. The article and the transparent sheet 21 are then relatively aligned, and the inclination of the transparent sheet is sustained until pressed in interfacial contact with the article by roller action. The rubber roller 33 is then applied with moderate pressure in strokes from the middle to either side starting at the end pressed to the working surface and gradually moving toward the opposite end as indicated. With this procedure, eight foot long panels can be laminated with superior results with only two persons.

As mentioned previously, the double adhesive coated plastic 17 may be transparent, although translucent white and opaque black are preferable for certain purposes. A further variation of the laminate 11 may be effected by substituting transparent double adhesive coated plastic for the transparent single adhesive coated front lamina 21 (FIG. 1b) as a basis for creating a special appearance. In this instance, a suitably shaped cutout, such as oval shape, is first cut from the plastic, and then the remaining portion of the double adhesive coated plastic is pressed onto the sheet-like article after removing the release paper 20 from the back side only of the plastic. The release paper 20 remaining on the front side provides a workable surface for rolling the transparent sheet into smooth, interfacial contact with the sheet-like article. Next, the front release paper is removed, and then lace or other decorative material is applied to the front adhesive surface to give a "through-the-window" appearance to the sheet-like article.

Another advantageous use of transparent double adhesive coated plastic in accordance with this invention is in connection with another variation of the laminate 11 of FIG. 1b for the purpose of backlighting one or more transparent photographic prints for display or artistic purposes. For such purposes, the base 15 is preferably of a rigid translucent material, such as a product of synthetic resin materials sold under the trademark PLEXIGLAS and being about one-eighth inch thick, the double coated adhesive plastic layer 17 is transparent, and the sheet-like article 13 is a transparent color print. The laminate may or may not also include a front transparent sheet 21. Such a laminate can be backlighted for viewing the color transparency. Sometimes two or even more color transparencies are put together for special artistic effects, and in such instance, in accordance with this invention, a lamina of double adhesive coated plastic 17 is sandwiched between each such color transparency.

A typical present mounting system of such color transparencies is to sandwich the transparency(ies) between a piece of clear rigid plastic and a piece of translucent rigid plastic and to bolt the assembly at the corners or tape the edges. While being tight at the corners or edges, such an assembly tends to separate in the mid areas, causing minor optic distortions and allowing for entrance of dust and other foreign matter. The laminate 11 overcomes these disadvantages and provides a display of lasting eye appeal.

Figures 9A, 10D:
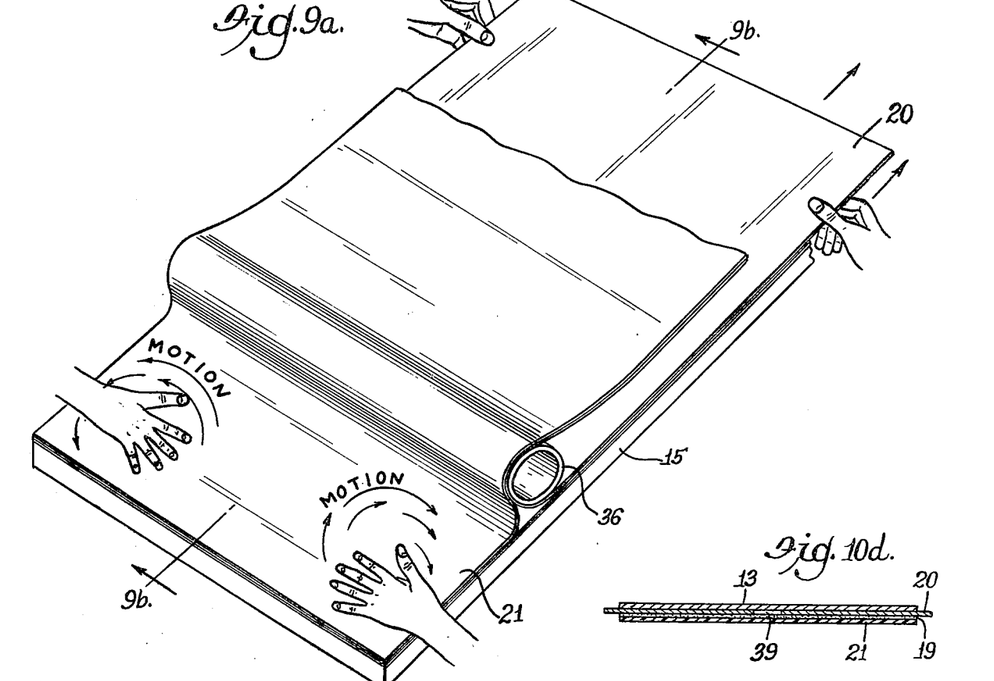
FIG. 9a is an enlarged fragmentary view in perspective of a partially completed laminate depicting a method as an alternative to the step shown in FIG. 7h and especially suitable for applying a front transparent sheet to a wide laminate.
FIG. 10d is a sectional view of the structure of the step shown in FIG. 10b as viewed in a plane taken along the line 10d—10d.

Earlier, steps represented by FIG. 7h' were described for applying the transparent sheet 21 to laminates made in accordance with this invention that are two feet by three feet or larger and that include sheet-like articles that are capable of accepting a wet mount utilizing the positioning solution 31. At the present time, rolls of material used for the laminations described herein are available in widths up to 54 inches, and it often is desirable to laminate front transparent sheets 21 of this width with sheet-like articles that should only be dry mounted, i.e., laminating paper materials not having a water resistant support as described earlier and thus not being suitable for use of the positioning solution 31. In such instance, a further deviation in the procedures described in FIGS. 7h and 7h' should be noted. As shown in FIG. 9a, after the surface of the sheet-like article has been prepared as described earlier, a transparent sheet is applied to the large surface by two people in a wrinkle-free manner as follows.

Figure 9B:
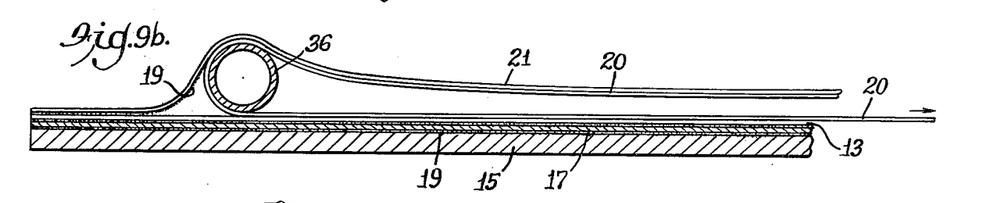

First, a piece of single adhesive backed transparent plastic 21 with release paper 20 thereon is unrolled from a supply roll and cut to a length just slightly longer than that required to cover the sheet-like article. This cut piece is initially placed on a work surface with the release sheet up, and the release sheet is peeled a few inches from one end and rolled back onto the unpeeled portion without creasing to provide an exposed margin of adhesive material 19. The piece is then turned over with the exposed margin down and the end edge and corners of the margin are aligned with the sheet-like article while the piece is held taut and slightly overhead of the article. Once aligned, the margin is lowered onto the article and pressure is then applied from the center outwardly to both sides along the end edge to thoroughly engage this marginal portion to the opposing portion of the sheet-like article. Next, a tube 36 is placed under the extended raised portion near the bonded margin inside the closed end of the loop formed by the rolled back portion of the release sheet 20. With a person on both sides of the work surface and each person gripping the free end of the release paper 20 with one hand as indicated in FIG. 9a (dimensions are exaggerated for clarity in FIGS. 9a and 9b) a coordinated feeding of the free end in a direction parallel to the graphic article and away from the engaged margin is commenced in a deliberate, steady motion to roll the tube 36 and progressively further peel the release sheet 20 from the plastic 21 while the other hand is used to apply circular pressure motions from the center outwardly on the transparent plastic to engage it with the face of the graphic article. The circular hand motions advance to directly follow the tube. This tube 36 may be of any suitable material that has a cylindrical surface and may be solid or hollow. Preferably, the tube is from two inches to four inches in diameter and at least as long as the material is wide. The tube holds the plastic material 21 straight across the material's width while pulling the material slightly downwardly toward the sheet-like article during the unpeeling of the release sheet. Yet the diameter of the tube holds the plastic material out of contact until the circular motions of the hands establish the contact in a wrinkle-free manner when following the movement of the tube. Heretofore, such a wrinkle-free surface was difficult to accomplish in dry mounting large surfaces, and very long sheets (for example, eight foot sheets) appeared impossible to laminate. This procedure readily accomplishes both feats and also reduces the static electricity that usually is created when removing the release paper from the plastic. The last step in this procedure is to trim the trailing edge of excess plastic hanging over the sheet-like article.

A further procedure for applying a front transparent sheet 21 on paper suitable only for dry mounting is recommended for instances when the plastic or transparent sheet 21 is less than the aforementioned thickness of between about 0.004 inch and about 0.005 inch. It was already mentioned that MYLAR is available in thinner sheets. Also, other flexible plastic materials are available in thicknesses of between about 0.001 inch to 0.002 inch. Use of such thinner flexible plastic conserves expense while adequately serving the purpose intended. A difficulty is encountered, however, in preventing the occurrence of wrinkles when applying such thin material. It has been found in such instance that satisfactory results are obtained by applying the sheet-like article to the front transparent sheet, rather than the other way around, in a manner generally illustrated in FIGS. 10a–10d.

First, a piece of the thin, single adhesive-backed transparent plastic 21 with release paper 20 thereon is cut to a length preferably longer by a few inches than the sheet-like article. Next, the piece is placed on a work surface (not shown) with the release paper up, and then the release paper is removed. With strips 37 of a suitable tape, the four corners of the plastic are taped to the work surface so that the plastic sheet is taut and its position is secure. The adhesive surface 19, of course, is exposed at this point, and care should be taken not to contaminate at least the main body portion of this surface 19 that is subsequently to come in contact with the sheet-like article. The extra few inches of length allows a work margin at either end for taping the corners without interfering with this bonding surface area.

Figures 10A, 10B, 10C:
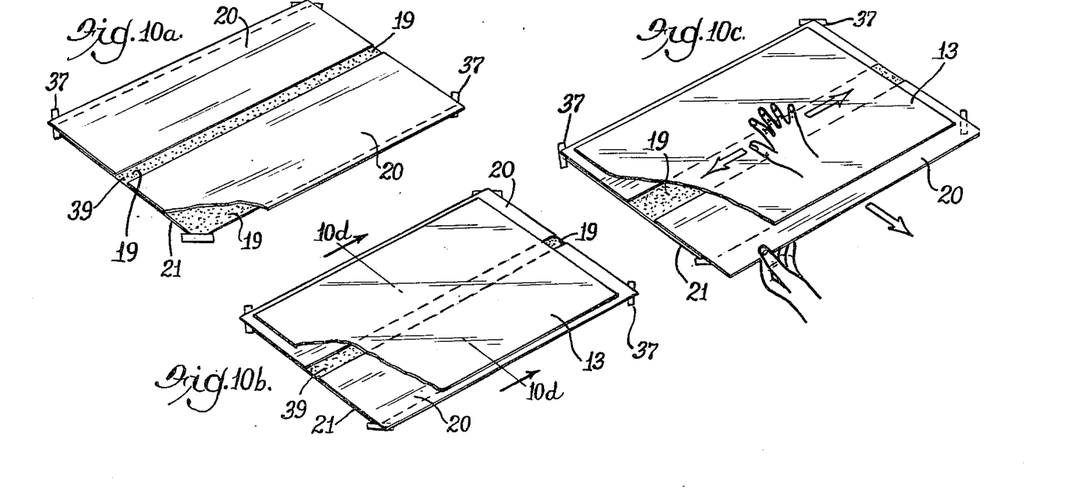
FIGS. 10a–10c are perspective views of alternative steps especially suitable for applying a very thin front transparent sheet to either a mounted or an unmounted sheet-like article.

The removed release paper 20 is then cut in two parts, and these two parts are replaced on the adhesive coating 19 after being separated by a gap 39 as shown in FIG. 10a. This gap 39, for purposes of illustration, is shown extending longitudinally of the sheet 21, but the release paper also could be cut in accordance with this invention so that the gap 39 would extend transversely. Further, as described earlier, when the release paper is replaced, it will lightly adhere again to the adhesive coating 19 if any pressure is applied to it. Because the following steps call for sliding the release paper, one half at a time, out from under the next applied lamina, it is desirable at this point to carefully lay the release paper over the adhesive coating when replacing it and to not apply pressure. Alternatively, as also previously described, it may be desirable to turn the removed release paper over and apply the dull side to the adhesive coating 19, because with some release papers, this dull side is non-the-less silicone coated and has less tendency to adhere to the adhesive coating than the shiny side that is against it initially. Again, however, before attempting this alternative step, a test should be made to determine the amount of adherence of the dull side before applying its full area to the adhesive coating. Not all release papers are coated alike.

Next, the sheet-like article is held tautly and placed face down over the gap 39 and onto the separated halves of the release paper 20 as indicated in FIG. 10b. Holding the sheet-like article tautly while laying it onto the release paper elevates the sheet-like article sufficiently to keep it away from the exposed adhesive surface 19 in the gap 39 as indicated in the cross-sectional view of FIG. 10d. The sheet-like article is then aligned with respect to the underlying transparent sheet (plastic) 21. After it is in the desired position, the sheet-like article is initially secured in position by pressing it firmly in contact with the adhesive coating 19 in the gap 39 by sweeping motions of the fingers of one hand from the center outwardly to the edges. Then with the other hand, as illustrated in FIG. 10c, one of the halves of the release sheet 20 is slowly but steadily pulled out from its sandwiched position while the first hand moves in the indicated directions in sweeping pressure motions that also follow the release sheet. This presses the surface of the sheet-like article smoothly and firmly onto the adhesive coating 19 of the transparent sheet 21. The working motions should move from the center outwardly in uniform strokes and in alternating directions as the hand follows the removal of the release sheet all the way to the edge. This procedure is then repeated for the second half of the release sheet.

The tapes 37 are then removed from the corners of the transparent sheet 21 and the whole lamination is turned over and laid down so that the plastic is up. The hard rubber roller 33 is then utilized in firm strokes radiating outwardly from the center in all directions to uniformly and positively bond the transparent sheet 21 and the sheet-like article 13, as indicated in FIG. 7h. The edges are then trimmed to complete the lamination.

Preferably, all of these laminations should be allowed to set for a few hours immediately after the laminating process before further movement or use of the lamination to assure all bonds.

Laminates formed in accordance with this invention appear in the various forms shown in FIG. 8, their various layers being bonded in interfacial contact by pressure sensitive adhesive coatings to form and maintain the integrity of the laminates. These laminates resist curling or warping with age or changes in moisture and temperature conditions, they maintain a high quality eye appeal, they are formed without need for costly machines, and they are useful in the various visual and training aid applications as well as for domestic and commercial displays and other like applications. The method described for this invention is flexible and can be utilized for small work only a few inches in size as well as for large work where sections as large as four and one-half feet by eight feet are involved. Present machines are costly and are not known to have this kind of flexibility. The economics of this improved graphic laminate as well as the method of forming same is apparent from the foregoing description.

Although the invention has been described in connection with a preferred embodiment with variations, other alternatives, modifications and variations may be apparent to those skilled in the art in view of the foregoing description. Accordingly, it is intended to embrace all such alternatives, modifications and variations as fall within the spirit and scope of the appended claims.

What is claimed is:

1. A method of making a laminate that includes a sheet-like graphic article having a water resistant support, comprising the steps of providing a mounting base on a work surface, providing a layer of plastic material having a pressure sensitive adhesive coating on both its surfaces and release paper in contact with the coating on one surface overhead of the base with the exposed adhesive coated surface facing the base, aligning the plastic material with respect to the base, applying the plastic material to the base by first pressing the plastic sheet in contact with the base at approximately the center of one edge and then pressing in strokes radially outwardly from that point while holding the unpressed portions of the plastic sheet out of contact with the base until contact is established by the strokes; trimming all edges of the laminate; removing the release paper; applying a positioning solution on the exposed coated surface of the plastic material; applying the sheet-like graphic article face up to the exposed coated surface having the positioning solution thereon; aligning the sheet-like article; and rolling the front surface of the sheet-like graphic article from the center of the surface in strokes radially outwardly to all edges of the laminate to remove substantially all of the positioning fluid from between the surfaces and to bond the surfaces.

2. A method in accordance with claim 1 further comprising the steps of providing a sheet of transparent material having a transparent pressure sensitive adhesive coating on one of its surfaces and release paper in contact with the coating; applying a positioning solution to the front surface of the sheet-like graphic article; removing the release sheet from the transparent material; applying the transparent material with the adhesive surface facing the sheet-like graphic article to the surface of the sheet-like graphic article; aligning the transparent material; and rolling the front surface of the transparent material from the center of the surface in strokes radially outwardly to all edges of the laminate to remove substantially all of the positioning fluid from between the surfaces and to bond the surfaces.

3. A method of laminating a sheet of transparent material on the face of a sheet-like graphic article, comprising the steps of providing a sheet of transparent material having a transparent pressure sensitive adhesive coating on one of its surfaces and release paper in contact with the coating; peeling a marginal amount of release paper from one end of the transparent sheet; folding the peeled portion of release paper back upon the unpeeled portion; applying the exposed coating of the margin to a work surface in a wrinkle-free manner adjacent one end of the sheet-like graphic article; extending the transparent sheet over and across the sheet-like article at an inclined angle; arranging relative alignment between the sheet-like graphic article and the inclined transparent sheet; removing the release paper remaining on the inclined transparent sheet; and rolling the front surface of the transparent sheet onto the sheet-like graphic article beginning at the apex end of the inclined sheet in strokes from the longitudinal midline outwardly to each side while gradually progressing against the inclined sheet toward the open end to uniformly bond the transparent sheet onto the front surface of the sheet-like graphic article.

4. A method in accordance with claim 3 wherein the sheet-like graphic article has a water resistant support, the additional step after arranging relative alignment between the sheet-like graphic article and the inclined transparent sheet and before removing the release paper, of applying a positioning solution to the front surface of the sheet-like graphic article.

5. A method of laminating a sheet-like graphic article on an adhesive coated face of plastic material wherein the adhesive coated face is initially covered with release paper, comprising the steps of removing the release paper from a part of the plastic material; severing the removed portion of the release paper from the remaining fixed portion; replacing the removed portion of release paper back on the coated surface after providing a gap between the two portions of the release paper; laying the sheet-like graphic article face up on the two portions of release paper and over the gap; aligning the sheet-like graphic article with the plastic material by sliding the graphic article on the release paper; pressing the sheet-like graphic article in contact with the adhesive coating exposed in the gap; removing one portion of the release paper at a time while maintaining contact in the gap; and applying pressure from the gap outwardly to each edge at a time following the removal of the respective portions of release paper to engage the sheet-like graphic article with the respective exposed portion of the adhesive coated surface.

6. A method in accordance with claim 5 including the further step of rolling the front surface of the sheet-like graphic article in strokes radially outwardly from the center to all edges of the laminate to assure uniform interfacial contact across the entire laminate.

7. A method of laminating a sheet of transparent material on the face of a sheet-like graphic article, comprising the steps of providing a sheet of transparent material having a transparent pressure sensitive adhesive coating on one of its surfaces and release paper in contact with the coating; peeling a marginal amount of release paper from one end of the transparent sheet; rolling the peeled portion of release paper back upon the unpeeled portion without creasing; aligning the marginal portion with the face of an underlying sheet-like graphic article; applying the exposed coating of the margin to one end of the sheet-like graphic article in a wrinkle-free manner by applying pressure from the center outwardly along the end edge; inserting a tube in the loop formed by the rolled back portion of the release paper such that it extends substantially across the width of the release paper; feeding the free end of the release paper in a direction parallel to the surface of the graphic article and away from the tube in a deliberate, steady motion to roll the tube and progressively further peel the release paper from the transparent material; and applying pressure in generally circular motions from the center outwardly to the side edges to engage the adhesive surface of the transparent material with the face of the graphic article, the circular motions being applied simultaneously with the feeding of the tube while advancing to directly follow the tube.

8. A method of laminating a sheet of transparent material on the face of a sheet-like graphic article comprising the steps of providing a sheet of transparent material having a transparent pressure sensitive adhesive coating on one of its surfaces and release paper in contact with the coating; removing the release paper; securing the transparent material on a work surface with the adhesive coating exposed; severing the release paper into two portions; replacing the release paper portions on the coated surface after providing a gap between the two portions; laying the sheet-like graphic article face down on the release paper portions and over the gap; aligning the graphic article with the underlying transparent sheet by sliding the graphic article on the release paper; pressing the sheet-like graphic article in contact with the adhesive coating exposed in the gap; removing one portion of the release paper at a time while maintaining contact in the gap; applying pressure from the gap outwardly to each edge at a time while following the removal of the respective portion of release paper to engage the sheet-like graphic article with the respective exposed portion of the adhesive coated surface.

9. A method in accordance with claim 8 including the further step of rolling the back surface of the sheet-like graphic article in strokes radially outwardly from the center to all edges of the laminate to assure uniform interfacial contact across the entire laminate.

10. A method of making a laminate that includes a sheet-like graphic article and means for causing magnetic attraction, comprising the steps of providing a layer of plastic material having a pressure sensitive adhesive coating on at least one of its surfaces and release paper in contact with the coatings; removing the release paper; applying a layer of magnetic material by pressing onto the exposed adhesive coated surface of the plastic material; providing a second layer of plastic material having a pressure sensitive adhesive coating on both its surfaces and a release sheet in contact with the coating on one such surface overhead of the layer of magnetic material with the exposed adhesive coated surface facing the magnetic material; pressing the second layer of plastic material onto the magnetic material; removing the release sheet from the second layer of plastic material; holding the sheet-like graphic article face up overhead of the exposed adhesive coated surface and aligning the sheet-like graphic article therewith; and applying the back of the sheet-like graphic article to the exposed coated surface in sweeping hand strokes from the center radially outwardly to engage the respective surfaces.

11. A method in accordance with claim 10 wherein the sheet-like graphic article has a water resistant support, the additional steps of applying a positioning solution on the exposed adhesive coated surface of the second layer of plastic material after removing the release paper and before aligning the sheet-like graphic article, and rolling the front surface of the sheet-like graphic article from the center of the surface in strokes radially outwardly to all edges of the laminate as a final step to remove substantially all of the positioning fluid from between the surfaces and to assure uniform interfacial contact across the entire laminate.

* * * * *